(No Model.) 3 Sheets—Sheet 1.

J. BENFIELD.
DIE FOR MAKING HORSESHOES.

No. 490,734. Patented Jan. 31, 1893.

WITNESSES
Charles Bosworth Kelley
Herbert Whitehouse

INVENTOR
Joseph Benfield (No Model.) 3 Sheets—Sheet 2.
J. BENFIELD.
DIE FOR MAKING HORSESHOES.
No. 490,734. Patented Jan. 31, 1893.
Fig 4
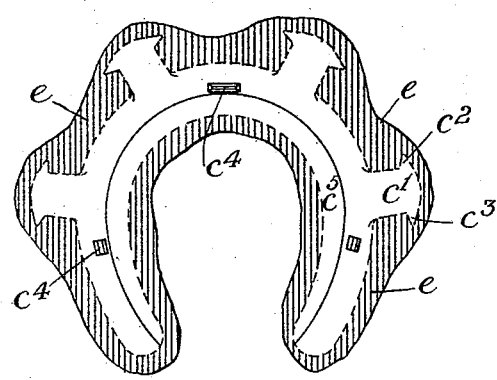
Fig 9
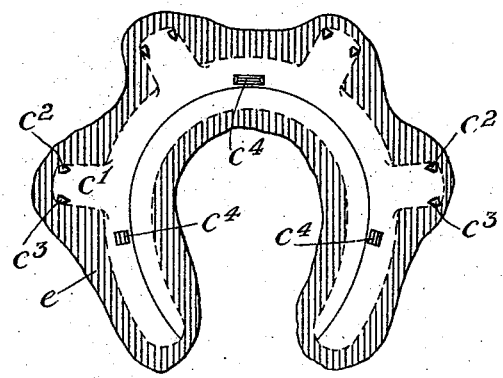
Fig 5
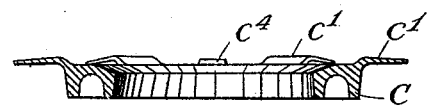
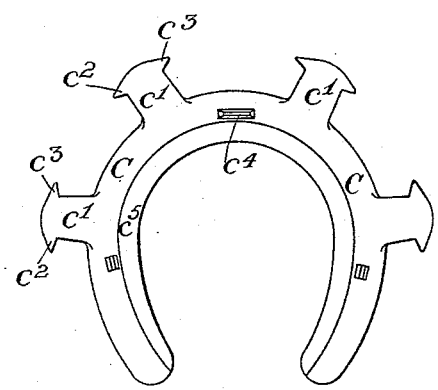
Fig 10
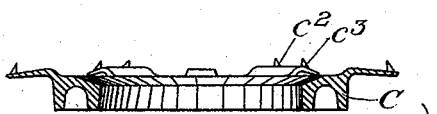
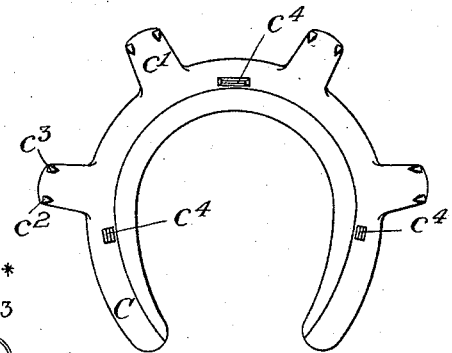
Fig 5*
WITNESSES
INVENTOR
Joseph Benfield (No Model.)　　　　　　　　J. BENFIELD.　　　　3 Sheets—Sheet 3.
DIE FOR MAKING HORSESHOES.
No. 490,734.　　　　　　　　　　　　Patented Jan. 31, 1893.
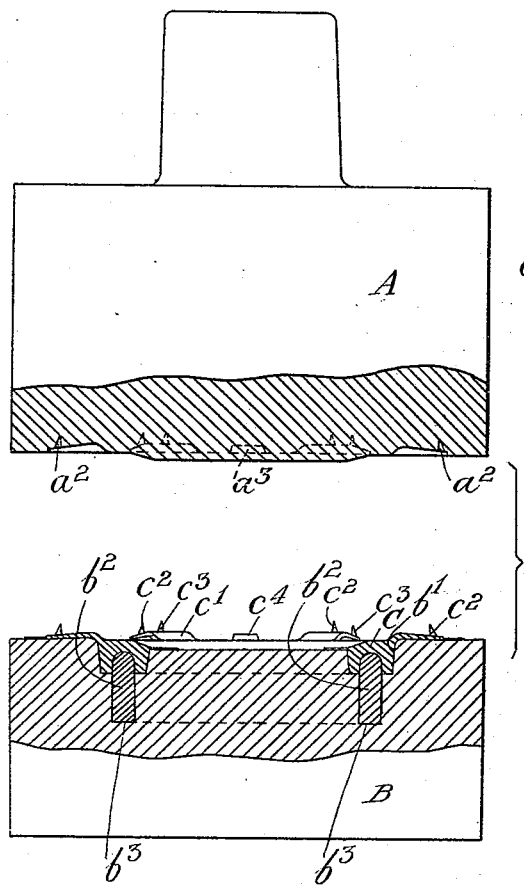
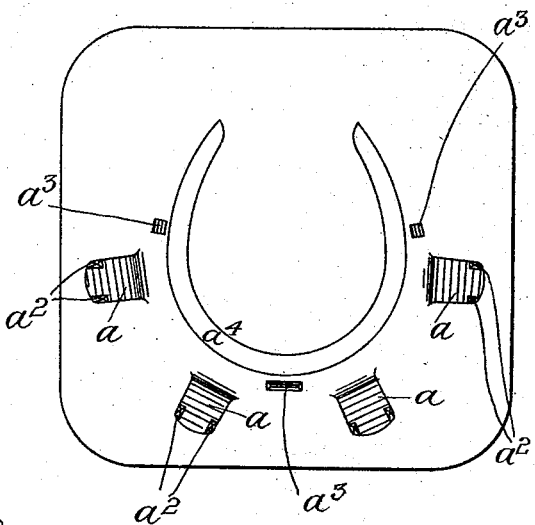
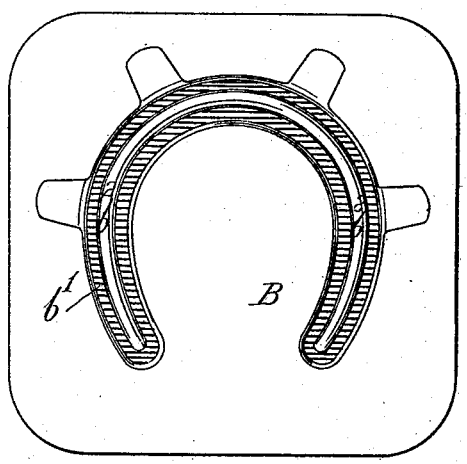
WITNESSES
Charles Bosworth Kelley
Herber Whitehouse
INVENTOR
Joseph Benfield

United States Patent Office.

JOSEPH BENFIELD, OF WALSALL, ENGLAND.

DIE FOR MAKING HORSESHOES.

SPECIFICATION forming part of Letters Patent No. 490,734, dated January 31, 1893.

Application filed December 9, 1891. Serial No. 414,471. (No model.)

*To all whom it may concern:*

Be it known that I, JOSEPH BENFIELD, a subject of Her Majesty the Queen of Great Britain, residing at Walsall, in the county of Stafford, England, have invented a certain new and useful Improvement in Dies for Making Nailless Horseshoes and other Like Shoes, of which the following is a specification.

This invention consists in the hereindescribed improved dies for making those horse shoes and other like shoes which are fixed to the animal's hoof by clips (usually jagged or roughened) the clips being formed integral with the shoe and projecting round the upper outer edge thereof so that when hammered or otherwise pressed against the animal's hoof to engage therewith they will secure the shoe thereon.

Figure 1:
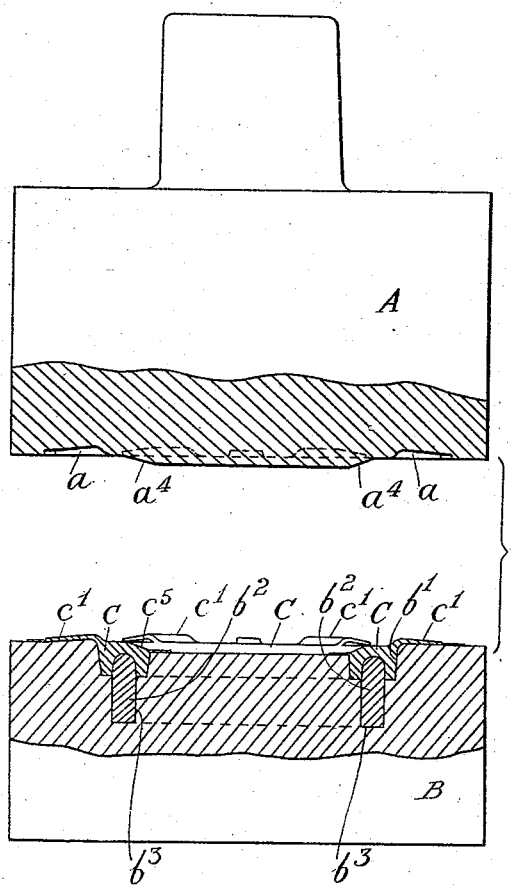
Figure 2:
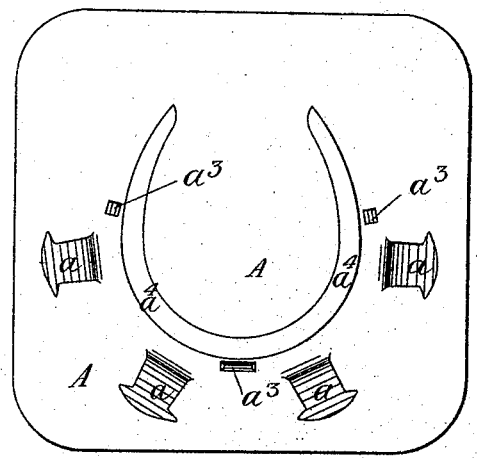
Figure 3:
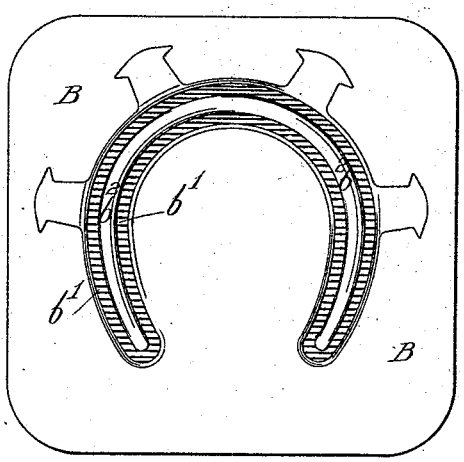

I will describe this invention by referring to the accompanying drawings on which Figure 1 represents in sectional elevation a pair of the improved dies which I employ for stamping the said horse shoes, a stamped blank shoe being also shown in position in the bottom die; Fig. 2 shows an inverted plan of the top die and Fig. 3 is a plan of the bottom die; Fig. 4 shows in plan the shoe stamping as it leaves the dies and Fig. 5 shows the partly finished shoe; Fig. 5* shows a part of the same when finished; Figs. 6, 7 and 8 illustrate a modified form of the said dies and Figs. 9 and 10 respectively show a shoe stamping as it leaves these dies and the partly finished shoe when the web or scrap has been cut away.

In making a shoe of the kind herein referred to I proceed as follows reference being made first more particularly to Figs. 1 to 5* both inclusive:—I take a heated bar of steel or other ductile metal or alloy bent roughly into the shape of the required shoe. This bar is preferably of a round, square, flat, or other solid section, or for making shoes which are grooved on the underside as shown in the drawings, a grooved bar may be used the bar in any case being more than sufficient to fill the dies when stamped as hereinafter described. I provide a pair of top and bottom dies arranged in a stamp, the bottom die being fixed to the bed of the stamp and the top die being carried by the hammer and suitably guided, the bottom die (or the top die) being sunk to the shape of the required shoe and its clips. In the drawings the said top and bottom dies are marked respectively A and B. The top die A has depressions $a$ corresponding with the clips $c'$ of the shoe C when the clips and their spikes $c^2$ $c^3$ are bent outwardly almost flat as shown in Fig. 5. The bottom die B is sunk at $b'$ to correspond with the body of the shoe, and the upwardly projecting part $b^2$ of this die (which forms the groove in the underside of the shoe) is for convenience by preference made separate from the die B as shown in Figs. 1 and 3 and arranged to fit in a corresponding recess $b^3$ in the die B. When the said heated bar is stamped between the dies A and B a stamping of a shoe C and its clips $c'$ (see Fig. 4) is formed with a thin web or fin $e$ all round (represented by the shaded portion in Fig. 4.) This web or fin is then (by dies of corresponding form worked in a press) cut or clipped off leaving the shoe C with its clips $c'$ each clip having one two or more side projections $c^2$ $c^3$ (as shown in Fig. 5) which are afterward turned up to form the spikes projecting from the inner surface of the clip at the edge thereof as shown in Fig. 5*.

Instead of stamping the shoe with a side projection or side projections on the clips to form the spikes as above described with reference to Figs. 1, 2, 3, 4, 5 and 5* one of the dies (preferably the top die A) may as shown in Figs. 6 and 7 have depressions $a^2$ corresponding with the required spikes (such as $c^2$ $c^3$) on the clips $c'$ so as to form the said spikes as shown in Figs. 9 and 10 during the process of stamping the shoe. The top die A has an inclined projecting part $a^4$ of a shape to form the seating $c^5$ round the top of the shoe.

When the shoes are required to have projections such as $c^4$ on their upper surface to enter the horse's hoof and assist in keeping the shoe steady thereon, depressions such as $a^3$ are made in the top die to correspond with these projections so as to form the projections in stamping the shoe.

I have illustrated this invention as applied to the manufacture of channel section horse and the like shoes made with four clips, but it is to be understood that this invention can be similarly applied to the manufacture of those horse and like shoes which have either a smaller or a larger number of the said clips; and when making solid horse shoes and other like shoes the projecting part $b^2$ of the die B, which forms the groove in the shoe stamping, is not required, the bottom of the groove $b'$ in the shoe being then made plain or otherwise to correspond with the bottom of the shoe.

Having now particularly described and ascertained the nature of my said invention and in what manner the same is to be performed I declare that what I claim is:—

1. In combination a pair of dies for forming horse shoes and adapted to receive a roughly bent bar, the lower die having a recess $b'$ in the form of the shoe designed to receive the bent bar one of the said dies having lateral depressions $a$ substantially as described for the formation of clips.

2. In combination a pair of dies one of which has a recess $b'$ of the form of the shoe a projection $b^2$ extending around in said recess, and one of the dies having lateral recesses for the formation of clips on the shoe substantially as described.

3. In combination a pair of dies one of which has a recess $b'$ of the form of the shoe and the other having a projecting portion $a^4$ with sloping edges adapted to enter a corresponding depression in the other die and having also the lateral depressions $a$ for forming the clips.

In testimony whereof I have signed in the presence of two subscribing witnesses.

JOSEPH BENFIELD.

Witnesses:
CHARLES BOSWORTH KETLEY,
HERBERT WHITEHOUSE.